Dec. 18, 1934.　　R. E. GILLMOR ET AL　　1,984,874
GYRO VERTICAL
Filed June 26, 1930　　7 Sheets-Sheet 1

Fig. 1.

INVENTORS
Reginald E. Gillmor
Bruno A. Wittkuhns.
BY Herbert H. Thompson
their ATTORNEY.

Dec. 18, 1934.  R. E. GILLMOR ET AL  1,984,874
GYRO VERTICAL
Filed June 26, 1930   7 Sheets-Sheet 2

INVENTORS
Reginald E. Gillmor
Bruno A. Wittkuhns
BY
Herbert H. Thompson
ATTORNEY Dec. 18, 1934.  R. E. GILLMOR ET AL  1,984,874
GYRO VERTICAL
Filed June 26, 1930   7 Sheets-Sheet 5

Patented Dec. 18, 1934

1,984,874

UNITED STATES PATENT OFFICE 1,984,874

GYRO VERTICAL

Reginald E. Gillmor, Forest Hills, N. Y., and Bruno A. Wittkuhns, Chatham, N. J., assignors to Sperry Gyroscope Company, Inc., Brooklyn, N. Y., a corporation of New York Application June 26, 1930, Serial No. 463,929

29 Claims. (Cl. 33—204)

This invention relates to certain improved and new apparatus commonly called an artificial horizon or an artificial vertical, and especially to that group of the above named apparatus which is actuated by a gyroscopic device. The purpose of our invention is to provide a device which at all times gives an indication of the true vertical with relation to a movable base or which indicates at any given time the angles of inclination of such a base against the natural horizon, wherein said indications are given by two separate angles measured in two axes perpendicular to each other.

An instrument as the one described above is useful for gunnery purposes, for navigation and for observation on board ships. It enables the gun crew to calculate the exact angle of elevation of the gun at the time of firing when the ship is rolling or pitching. It furthermore provides a stabilized platform on which can be mounted a telescope for observations of distant objects from a ship, and also is a help in making nautical observations for navigating purposes. It makes it possible to fire the guns automatically or manually at any desired relation of the said guns to the horizontal, thereby permitting the accurate control of gun fire on an obscured target. It also makes it possible to accurately determine the tilt of the gun trunnions and to automatically or manually calculate the precise values of the corrections to the azimuthal and elevation angles of the guns in order to compensate for trunnion tilt.

The apparatus as set forth in the following description is designed to work entirely automatically and to maintain a stabilized platform parallel to the natural horizon and a true vertical axis continuously and constantly within very narrow limits of error. To further illustrate the design and performance of our invention, we refer to the drawings in which.

Figure 1:
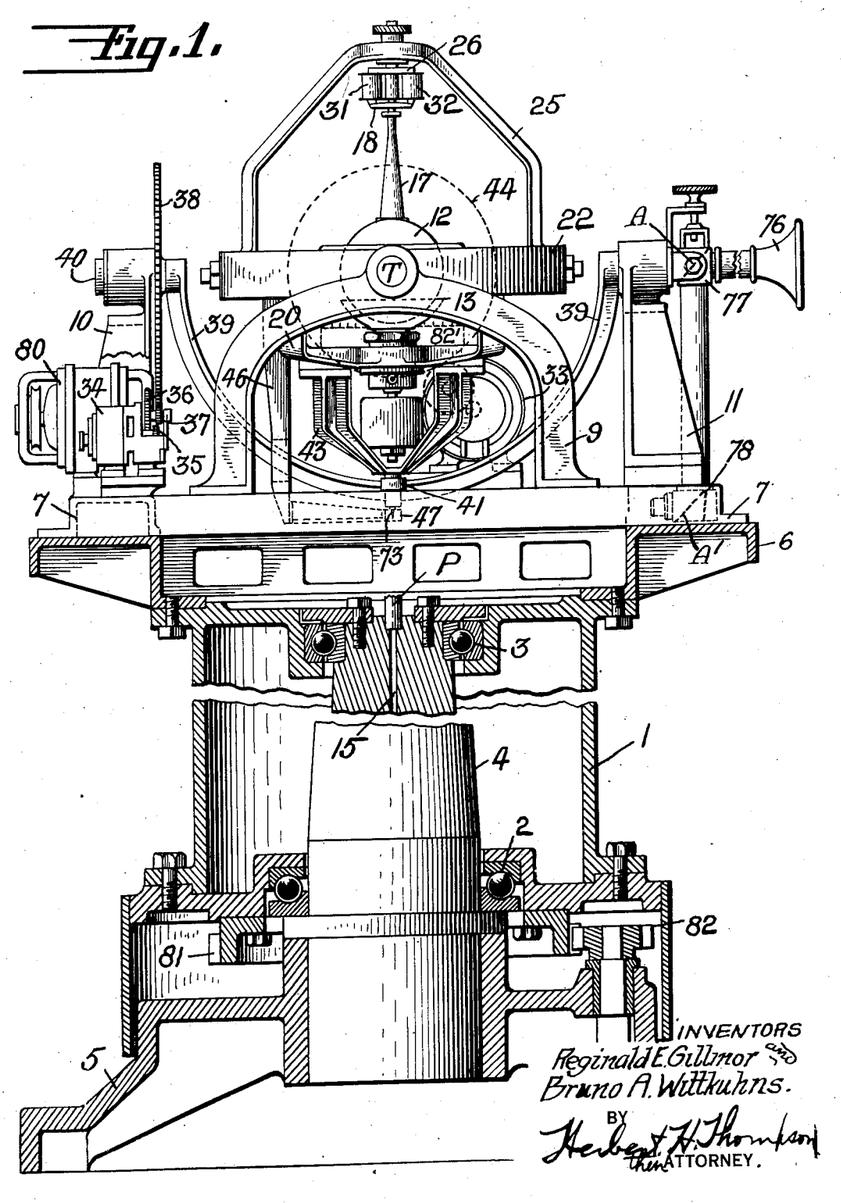
Fig. 1 shows an elevation view of the artificial horizon and a sectional view of the pedestal on which the same is mounted.

As shown in Fig. 1 the artificial horizon is mounted on a pedestal 1. This pedestal has two ball bearings 2 and 3 arranged in such a way as to allow the pedestal to revolve around the vertical shaft 4, which in turn is rigidly mounted in its socket or base 5. This socket may be screwed to the deck of the ship or whatever base is employed. The upper part of the pedestal 1 carries a platform 6 which serves as a mounting base for the supporting frame 7, which carries the bearing posts or supporting brackets 8, 9, 10 and 11. Said posts 8 and 9 carry the main trunnions T, of the artificial horizon. The axes of said pivots are preferably identical with the two axes of observation of the artificial horizon.

Figures 2, 15:
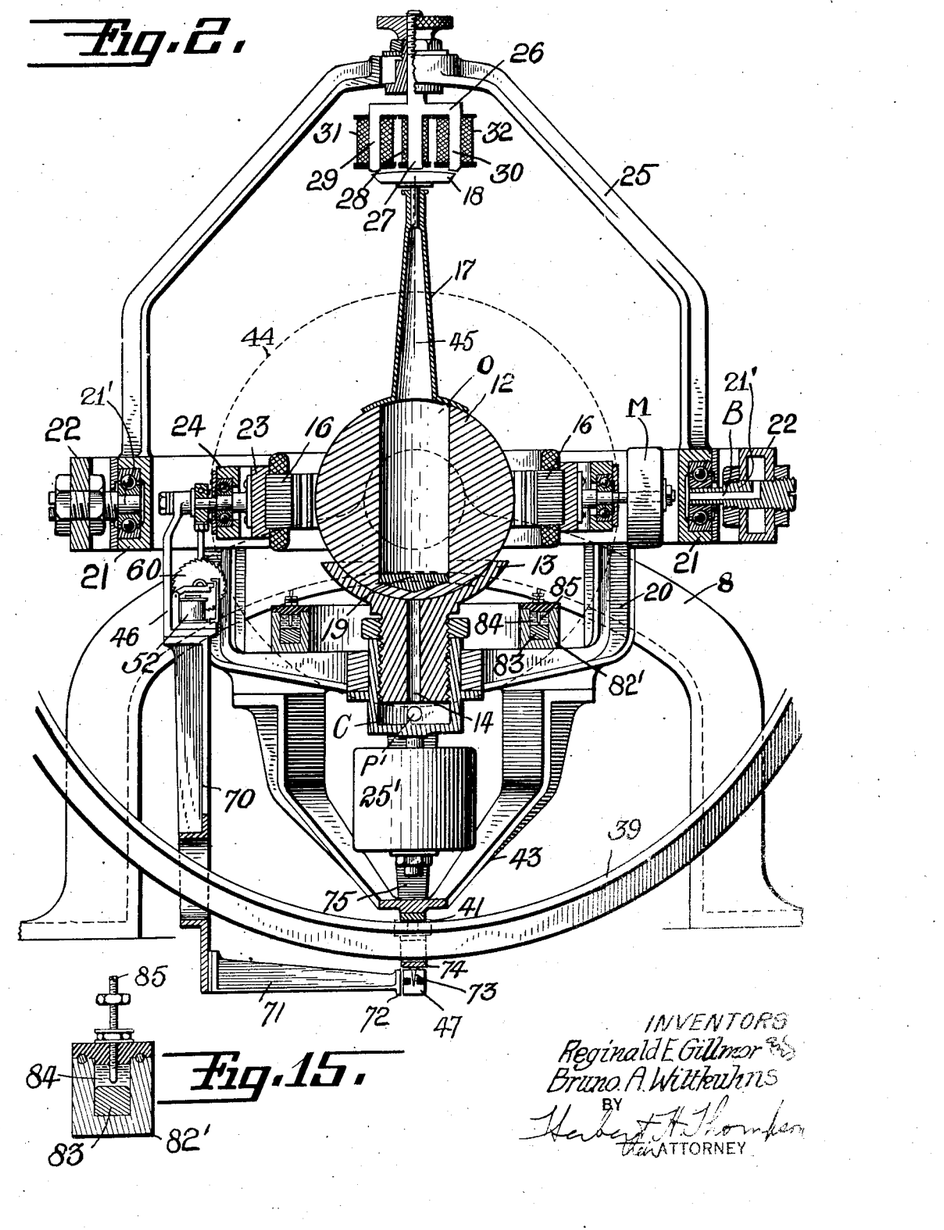
Fig. 2 shows a sectional view of the sensitive element of the artificial horizon.
Fig. 15 is an enlarged sectional view of the liquid level device.
Figure 14:
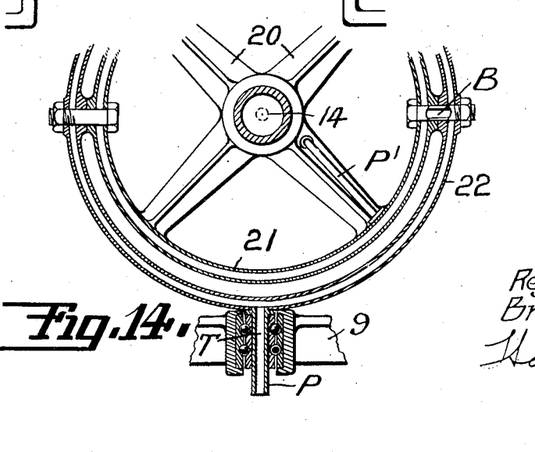
Fig. 14 is a horizontal section through the outer gimbal supports showing how the compressed air is led into the cup.

The gyroscopic element of the instrument is a ball-shaped rotor 12. A cup 13 is provided with an inner spherical surface of the same curvature as the ball and serves as a support and single bearing for same. Compressed air may be fed into the spherical surface of contact between the ball and the cup through the passage 14, the air being led through the center bore 15 of the shaft 4 in Fig. 1 and from there (Fig. 14) through a suitable pipe to the hollow trunnion T and through the hollow gimbal rings 22 and 21 and bearing B to the chamber C and passage 14 through pipe P' (Fig. 2). The ball 12 is lifted by the air pressure until an equilibrium is found between the weight of the ball and the pressure of the air escaping through the small spherical clearance between the ball and the cup 13. The effect of this escaping air is the same as oil in a bearing, the ball actually floating on a thin spherical air film. Due to the very low viscosity of air as a lubricant there is practically no friction between the ball 12 and its bearing 13 and the ball, therefore, is free to turn or revolve in any desired direction. We have found, however, that this supporting air film may be maintained by the rapid rotation of the ball, so that the compressed air supply may be shut off once the ball is up to speed.

For spinning the ball-gyroscope, a ring-shaped stator 16, similar to stators commonly used on three-phase induction motors, is suspended in such a way as to be concentric with the ball 12. If this stator is energized from a suitable source of three-phase A. C., the revolving field of the stator will set up eddy currents in the solid metal ball, whereby torques are produced which try to keep the ball in step with the stator field, resulting in rapid spinning of the ball around its vertical axis. The speed of the ball is a function of the number of poles of the stator, of the frequency of the initial A. C. current, and of the slippage of the rotor against the stator field. By choosing a high frequency and a large air gap we can cause the ball to spin at a speed of several thousand R. P. M., at the same time keeping the electrical and magnetic linkage between the ball and the stator so low as to prevent too close a reaction between stator and rotor.

A remote control follow-up device is provided for the ball. For this purpose the ball carries a spindle 17 of light metal and on top of same a round steel button 18, the upper surface of which is spherical in shape and in the lower part of the ball a counterweight 19 of extra heavy metal is arranged in such a way that the center of gravity of the ball and its attachments is located exactly at the center point of the spherical rotor. This means that the ball and everything attached to it is statically balanced around all possible axes. On the other hand the axial chamber O between the spindle and the counterbalancing weight results in making the axis of the spindle the spinning axis of maximum movement of inertia of the ball. The ball will, therefore, always ultimately spin about this axis of maximum inertia regardless of the axis of driving torque imparted to the ball.

The cup 13 is adjustably mounted in the multi-armed spider 20, which in turn is secured to ring 21, pivotally mounted in the gimbal ring 22 on pivots 21'. Ring 22 in turn is pivotally mounted in the bearing posts 8 and 9 forming a gimbal ring support. Such a cardan system gives the outer ring freedom in one axis and the inner ring freedom in two axes perpendicular to each other.

A second independent gimbal system carries the stator 16. The stator itself is mounted in the ring 23 which is pivotally mounted in gimbal ring 24. Ring 24 is pivotally mounted in ring 21, the two pivots being in a plane perpendicular to that of the drawings and, therefore, not shown. It is obvious, therefore, that the rings 23 and 24 comprise a gimbal system independent of the rings 21 and 22. The position of the stator 16, therefore, is independent from the position of the ring 21 and entirely free in two axes perpendicular to each other. The main axes of both gimbal ring systems, however, pass through the same points and are in line with each other. Adjustable balancing mass or masses M may be provided on the gimbals if desired.

Figure 5:
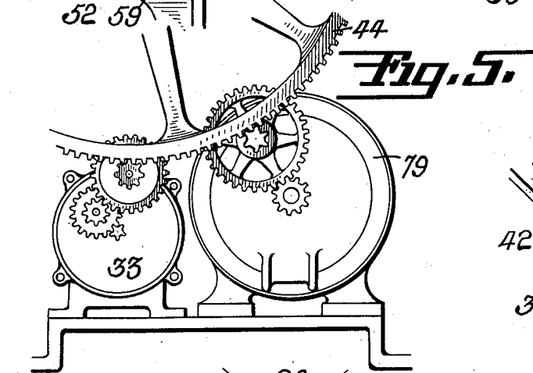
Fig. 5 shows the gearing connecting one axis of the artificial horizon with one elevation motor and one transmitter generator.

Ring 21 carries an arm 25 which is counterbalanced by weight 25' and which extends across the whole system and in which is adjustably mounted the part of the remote control device which cooperates with member 18. Such part is in the form of a cruciform coil arrangement 26. This device consists of a center core 27 and its coil 28 and of four outer cores of which only 29 and 30 with their coils 31 and 32 are shown in Figs. 1 and 2. The cruciform system is lined up so that the axes of two of the coils are in the plane of one of the main axes of the gimbal systems, while the two other coils 29', 30' (Fig. 11) are in a plane perpendicular to the first one, this second one being in line with the second main axis of the gimbal systems. The center coil 28 is energized by a very small alternating current and thereby acts as the primary of a transformer, the other four coils being secondaries. Coils 31 and 32 are connected in series to each other in opposite sense, so that their potentials will cancel each other as long as they are equal. They are equal as long as the button 18 is in a central position. As soon as this button moves in a plane parallel to that of the drawings, one coil will receive a higher flux density than the other one due to the change in air gap, resulting in a higher potential in one coil and a lower one in the other one. The output of the two coils together, therefore, will be equal to the difference of the two potentials of the two coils. If the button moves in the opposite direction, the output will become zero when the button is central and will then get larger again but with a change of its phase angle of 180°. This output of A. C. potential of changing amplitude and changing phase is employed to feed into a vacuum tube amplifier as described in my joint co-pending application Serial No. 381,660, filed July 27, 1929. The output of this amplifier drives a small A. C. motor 33, Fig. 5.

The two other coils 29', 30' of the cruciform system 26 act in exactly the same way but the output of their amplifier feeds into a similar motor 34 (Fig. 1). As shown in Fig. 1, the motor 34 is connected by gears 35, 36, 37 and 38 to a pivotally mounted bail 39, the bearings of which are in the bearing posts 10 and 11. The bail 39 serves the purpose of connecting the gimbal ring 21 to the gear 38 about axis 40. This is accomplished by two rollers 41 and 42 (Fig. 6) straddling the bail 39 and being carried by the spider 43, which in turn is carried on the gimbal ring 21 by means of the spider 20. Any motion of the gimbal ring 21 about pivots 21' will result in an angular motion of the bail 39. The result of this arrangement, therefore, is that the gear 38 will represent in its motion the angular motion of the gimbal ring 21 in the plane vertical to the drawings. A similar gear 44 is connected to the pivot shaft of the ring 22, which is pivotally mounted in the bearing posts 8 and 9. The motions of this gear, therefore, will represent the angular motions of the ring 22 in the plane of the drawings, Fig. 1. It is obvious that the gears 38 and 44 together will cover any motions of the ring 21, each one giving the component of that motion in its own axis.

In the same way as the motor 34 is connected to the gear 38 the motor 33 is connected to the gear 44. As explained before, these motors will be energized as soon as the button 18 leaves its central position and moves sideways. Inasmuch as each motor is controlled by the secondary coils in one plane only, the cruciform system will divide the motion of the button 18 into two components vertical to each other, thereby energizing the motors 34 and 33 in such a direction as to move the gimbal ring 21 in two axes until the center of the system 26 is exactly above the center of the button 18. If we now assume that the spherical rotor 12 is spinning rapidly on a truly vertical axis, then the gimbal ring 21 must be held in a truly horizontal plane by means of the two motors 33 and 34. If the base, or the ship on which the artificial horizon is mounted, rolls, the system 26 will start to respond to the roll by trying to move away from the center of the button 18. The button 18, due to the gyroscopic action of the rapidly spinning ball 12, will maintain its vertical position. As soon as there is a difference in position between the center of the button 18 and the center of the system 26 either one or both elevation motors 34 and 33 will be energized and will revolve their gears 38 and 44 respectively. The gear 38 will exercise a torque on the ring 21 through the bail 39 and the rollers 41 and 42, and the gear 44 will directly turn the other pivot of the ring 22 thereby acting on the other axis of the ring 21. Inasmuch as the system 26 is carried directly on the ring 21 the motions of the two motors 34 and 33 will be combined in the resulting motion of the system 26. Due to the correct coordination of the coil pairs of system 26 each to one of the motors, the resulting motion of the system 26 will be such as to restore the center of the system 26 to its position above the center of the button 18. This means that it will seem to the observer as if the system 26 is always closely following the button 18 no matter what or how the base 6 or the ship may move. As long as the axes of the ball 12 stay vertical the ring 21, therefore, will be stabilized in a horizontal plane.

As already previously explained, the stator 16 (Fig. 2) is mounted in an independent gimbal system consisting of the rings 23 and 24. The stator, while driving the ball 12, exercises a definite influence on the vertical axis 45 of the ball, always trying to line up this axis with the vertical electrical axis of the stator itself. This means if the stator is tilted the ball will, after a certain time, line up again with the electrical axis of the stator, thereby assuming the same tilt. Moreover, the axis of the ball will line up with the axis of the stator by the shortest path and without oscillation. In other words, we erect the ball-gyroscope from a separate pendulous controller (the stator as controlled from the auxiliary pendulums hereinafter described) by a self-aligning coupling therebetween. We thus obtain by the simplest means a most important feature which has been the object of many complicated systems for damping the oscillations of gyro verticals.

The manner in which the axis of the ball is caused to aperiodically follow the axis of the stator can be understood by imagining the stator in Fig. 1 to be displaced 90-degrees around the horizontal axis projecting from the paper. If this should occur while the ball is rotating around its major axis (the axis of the spindle—and button) we see that the stator would apply a torque around the horizontal axis in the plane of the paper. The result of this torque would be to precess the ball around the horizontal axis projecting from the plane of the paper. The ball axis would, therefore, follow the axis of the stator directly and would line up with the axis of the stator without oscillation.

The rate at which the ball follows the stator depends to some extent upon the angular momentum of the ball and the air gap between ball and stator. The most important factor affecting the period, however, is the relation between the electro-magnetic efficiency of the stator driving torque around the major or spinning axis of the ball and its efficiency around other axes of the ball. Suppose, for example, that the ball 152 (see Fig. 18) were made of glass or bakelite with the exception of a narrow equatorial laminated steel rotor 153 having its axis coincident with the major axis of the ball. If desired the rotor could be provided with copper bar windings in the form well known in connection with induction motors. With such a glass ball and laminated rotor, we would have a construction such that the stator could act with great efficiency around the major axis of the ball, thus spinning the ball at nearly synchronous speed. If, however, the stator axis is displaced from the ball axis, then that component of the stator drive around axes other than the major axis would be very inefficient since the stator would not act on the glass portion of the ball and would act on only a very small portion of the laminated steel rotor. Moreover, the laminations would still further reduce the efficiency of the drive about any axis other than the major axis. Therefore, with a glass or bakelite ball having a very narrow laminated steel rotor, the ball axis would follow the stator axis at a very low angular rate. Between the extremes of glass ball and solid steel ball, many means may be employed as, for instance, wide rotors in glass balls or narrow steel rotors in brass balls. We are thus given a wide choice in the period or angular rate at which the ball can be made to follow the stator. Actually we have found in practice that even with a solid steel ball and a narrow air gap between stator and ball, the period is sufficiently long to satisfy most of our requirements. The time required for the ball to assume its new position, due to the inclination of the stator, is called its period. This period depends on the magnetic linkage between the stator and the ball and on the actual running speed of the ball. Furthermore, it depends upon the angular momentum of the ball. It is obvious, therefore, that the stator gives us a means of influencing the position of the vertical axis of the ball without actually touching the ball itself. The above method of controlling by gravity the position of the gyroscopic rotor possesses many advantages over the usual pendulous control in which the gyroscope, as a whole, is made pendulous and the gravity acts directly on the gyroscope. In such case, due to the law that a gyroscope will precess at right angles to the applied force, gravity does not directly reduce the tilt but sets up a conical oscillation of the gyro axis which continues until damped out. In the present system, however, since gravity acts only through the stator, which imparts the spin to the ball, it is found that the action is such as to directly reduce the tilt and, therefore, the forced conical oscillations are not set up and the gyroscope moves dead beat to its vertical position after being disturbed. The amount of inclination of the stator to effect this result depends upon the factors previously mentioned—i. e., somewhat upon the angular momentum of the ball and the air gap between ball and stator but largely the relation between the electro-magnetic efficiency around driving axis and other axes. This is of great advantage in artificial horizons where the period is made very long and, therefore, in which an oscillation once set up will continue for several hours in the ordinary pendulous type of gyroscope.

It is also a known fact that any spinning gyroscopic device is subject to the influences of the motion of the earth. Inasmuch as the gyroscope will tend to keep its axis in constant position in space, it has to assume a tilt against its base proportional to the motion of the earth to which the base is fixed. If one desires to keep the axis of the ball in a constant position to the base, it is necessary to precess the ball at a rate and in a direction counteracting the precession caused by the motion of the earth. If we assume that the ball is spinning around a vertical axis while the stator axis is also vertical, the top of the ball will gradually tilt over towards the west until an equilibrium between the stator reaction and the precession of the ball is reached. At that point the axis of the ball will apparently maintain a fixed position with regard to the base, but it will be at an angle against the electrical axis of the stator. If now the stator is tilted an amount nearly equal to this angle in the opposite direction, the result will be that the ball will slowly assume a position which is truly vertical. The amount of inclination of the stator to effect this result depends upon the magnetic linkage and upon the latitude at which the device is operated. The tilt will be zero at the north pole and will be a maximum at the equator and, therefore, is proportional to the cosine of the latitude.

Figure 3:
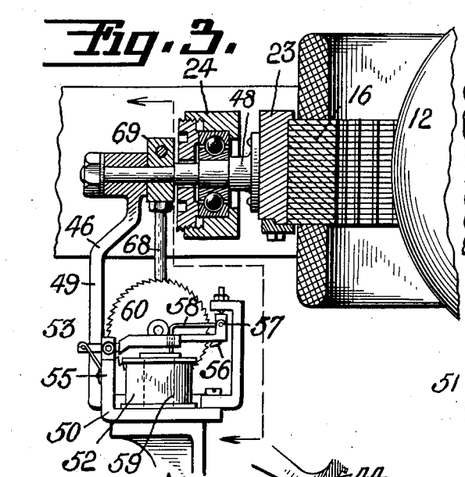
Figs. 3 and 4 show the arrangement of the pendulous inclination control of the stator.
Figure 4:
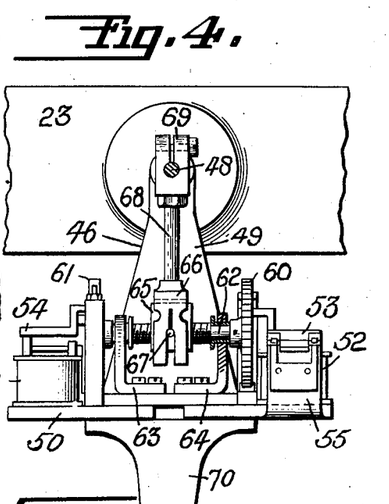

The only means of continuously providing a check of the true vertical is the pendulum or level. We, therefore, make our stator pendulous or pendulum control so that its average position is always governed by the direction of the gravitational force. As shown in Fig. 2, a pendulum 46 is provided on one axis of the stator while a pendulum 47 which may be similar in all respects to 46 is affixed to the other axis at right angles thereto. The details of both pendulums are shown in Figs. 3 and 4. A pivot 48 is affixed to the ring 23. This pivot is mounted by means of a bearing in the ring 24 and projects far enough to carry the arm 49 which can turn freely on the pivot 48. This arm carries a platform 50, which constitutes the major part of the weight of the pendulum. On this platform are mounted two electro-magnets 51 and 52 with their armatures 53 and 54. One end of the armature 53 is mounted pivotally in an arm 55, extending upward from the platform 50, while the other end of the armature carries a pawl 56 pivotally mounted at point 57. The lever 58 is an integral part of the pawl 56 and is bent at right angles so as to extend through a hole in the armature 53, its end resting on the face of the core 59 of the magnet 52. If the magnet 52 is energized the armature will be attracted, thereby pushing the lever 58 up, at the same time moving the pawl 56 inwardly so that same engages in the ratchet wheel 60, turning same for one tooth. The other magnet 51 acts in a similar way on a ratchet wheel 61 but in such a way as to move the wheel in the opposite direction to that of the wheel 60 (see also Fig. 11). Both wheels 60 and 61 are mounted on a shaft 62 which in turn is carried on bearing posts 63 and 64. That part of the shaft 62 which is located between the bearing posts carries a screw thread. A nut 65 of square shape is threaded on shaft 62. A double fork 66 straddles this nut so as to prevent turning. If one of the ratchet wheels is actuated and starts to revolve, the nut 65 will move sideways. The pin 67 will cause the fork 66 to move along, thereby also causing an angular movement of the arm 68 to which the fork is connected. The arm 68 is tightly connected to the pivot 48 by means of the clamp 69, so that any movement of either one of the ratchet wheels will result in a tilting motion of the stator 16 around the axis of the pivot rod 48. The combined weight of the arm 49, the platform 50 and all other parts connected to this arm is much greater than the weight of the arm 68 and the fork 66, while the stator 16 itself is balanced. Adjustment of the ratchet wheels shifts the center of gravity of the pendulous weight sideways resulting in a tilt of the stator. The pendulum 47, which is affixed to the side at right angles to pendulum 49 of the stator, acts in exactly the same way. The reason for having two electro-magnets 51 and 52 is the necessity of altering the tilt of the stator in case the ship or the base on which the apparatus is mounted turns in azimuth.

As explained above it is understood that the axis of the stator is to be maintained at a certain angle to the vertical in order to provide just the right amount of precession in the correct direction to keep the ball axis vertical. This means that the electrical axis of the stator at a given latitude always must point to a certain fixed star no matter what the movements or motions of the ship or the base are. In case the base is stationary and not moving, the tilt of the stator will be in one or two axes depending on the position of the axes, but it will be constant. As soon as the base starts to move in azimuth we have to change the tilts for both axes of the stator corresponding to the motion in azimuth in such a way as to keep the stator axis always pointing to the same fixed star. Suppose, for instance, that one axis of the instrument points north-south and the other axis points east-west, and suppose, furthermore, that the tilt of the stator is such as to show an inclination toward the east, and that now the base is turned 90°. If the tilt of the stator would not be changed it would now show an inclination toward, say, the north, and the ball axis within a few minutes would leave its vertical position and show an error. If, however, means are provided to cancel the tilt of the stator around its previous north-south axis and to transfer this tilt to the previous east-west or present north-south axis, then the ball would maintain its vertical position.

The four electro-magnets mounted on the two pendulums provide means to accomplish this result. By actuating the correct magnets it is possible to move the ratchet wheels for the correct number of teeth in the correct direction to produce the desired tilt, or to cancel this tilt by operating the opposite magnet and ratchet wheel for the same number of teeth in the opposite direction. By actuating magnets on both of the axes simultaneously in the correct manner, it is possible to maintain the same tilt of the stator in space no matter how the base moves in azimuth.

Figure 6:
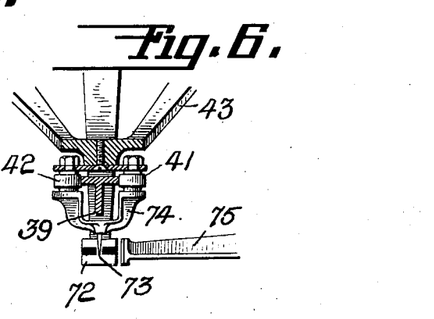
Fig. 6 shows in detail the checking device.

Experiments have shown that it is advisable to make the period of the ball as explained above as long as possible for the following reasons. If the instrument is mounted on a ship it will be subject to rolling and pitching. The stator, being pendulous around two axes, will respond to roll and pitch not only by always trying to remain governed by the direction of gravity, but the two pendulums will be subject to acceleration at the end of each rolling motion. They will swing out at these points and would disturb the vertical axis of the ball if the period of the ball was short enough to follow these quick motions. The average position of the pendulums naturally will always indicate the true vertical but a long period of the ball will provide the possibility of eliminating the influence of acceleration swings of the pendulums, which naturally will be followed by proportional movements of the stator. The pendulum 46 carries at its lower end another arm 70 as shown in Figs. 1 and 2. A similar arm is carried by the pendulum 47. The horizontal part 71 of arm 70 carries a plate 72 (Fig. 2 and Fig. 6) on which is shown a reference mark. A pin 73 is carried on the bridge 74 connecting the pivots of the rollers 41 and 42, and thereby connected to the gimbal ring 24. This pin is mounted so as to be lined up exactly with the vertical axis of the gimbal ring, the cup and the ball. This pin should always be in the center of the marker (Fig. 6). A similar reference mark is carried on arm 75 of pendulum 47, and the pin should also be in the center of the marks on this arm for an observer looking at the pin in a plane parallel to that of the drawings in Fig. 6. Two telescopes are provided to allow observers to check the position of the pin. One telescope is shown in Fig. 1 and marked 76. The other one is not shown in Fig. 1, being behind the apparatus in this figure but appearing at 76' in Fig. 13. The eye piece 76 is adjustably mounted on the pivot of the bail 39 in such a way as to be optically in line with the mechanical axis. A rectangular prism A is contained in the casing 77, and a similar one A' in casing 78 so that the line of vision is deflected twice through 90°. The result is that an observer looking into the eye piece 76 will see the pin 73 in the center of the reticule and in the center of the marker on either plate 72 or 75. Should the axis of the ball be out of the vertical line then the pin 73 will appear out of the center of the marker 72 in either one or both axes. Provided sufficient damping is given to the pendulums, and also provided that the motions of the base are not too quick and abrupt, the telescopic observation will show exactly the errors of the whole system.

For practical reasons it is necessary to provide means for the transmission of the angles that the two main axes of the artificial horizon make with its base to either a gun platform or a computer, or similar instruments where the indications of these angles may be needed to evaluate data necessary for training one or more guns on a target. To accomplish this well known self-synchronous transmitting systems are used. We show in Fig. 5 a self-synchronous transmitting generator or transmitter 79 geared to large gear 44. If the elevation motor 33 revolves while keeping one axis of the gimbal ring 24 in its correct position while the base is moving, it also will rotate the armature of the transmitter 79 through proportional angles, these angles being duplicated in a repeater motor electrically connected to the transmitting generator 79. A similar transmitter 80 is employed on the other axis, this transmitter actuating a distant repeater to indicate the angles around the second axis.

As shown in Fig. 1, the whole pedestal 1 on which the artificial horizon is mounted can revolve in azimuth around the shaft 4 on thrust bearing 2. Means are provided to maintain the pedestal and, therefore, the apparatus with one of its trunnion axes in line with the trunnion axis of the gun. For this purpose there is provided a gear 81 on the base of the pedestal which meshes with the pinion 82 driven directly or indirectly from a repeater motor (not shown), which in turn is actuated from the sight or from a gun position transmitter as in the patent to Mortimer F. Bates, No. 1,829,181, dated October 27, 1931 for gun fire control system.

For actuating the pendulum shifting devices shown in Figs. 3 and 4, and thus maintaining the ball and cup vertical through the reaction between the ball and stator, we provide a liquid level device 82' mounted on the framework 20 of the cup. Said device may be in the form of a hollow ring having a U-shaped section and containing mercury 83 and oil 84. Contacts 85 are positioned around the ring so that their points lie just above the mercury surface when the ring is level. When the ring becomes inclined, however, the mercury will flow to the low side making contact with one or more of the contact points on the low side and completing a circuit through one or both of the reversible motors 86—87 (see Fig. 11). The contacts may be connected in series with resistance elements 88 so that speed of the motor is increased as the inclination increases. Said contacts are also positioned in quadrature so that one set of contacts 88, for instance, operates the motor 86 in one direction, while the opposite set 88' operates the motor in the opposite direction. Similarly, the set of contacts 90 operates motor 87 in one direction and contacts 90' in the opposite direction. Each motor is connected through shafts 91 and worm and worm wheel 92—92' to a toothed wheel 93, the motor being normally centralized by a spring 94, which is connected to a thread 95 wound around a spool 96 on shaft 91. Preferably said worm wheel 92' is connected to the said toothed wheel through an arm 94' and opposed spring 95', the movement of the arm 94' being limited by stops 96'. Also cooperating with the toothed wheel is a spring-pressed roller 97, these parts cooperating to prevent the wheel from stopping except when the little contact roller 98 is between two teeth. Said roller 98 is carried on a spring arm 99 and when a tooth contacts therewith it completes one or the other of contacts 100—100', dependent on which way the ratchet wheel is revolved. Said contacts are in circuit with the hereinbefore described ratchet mechanism 59 on the auxiliary pendulums 46—47 so as to displace the pendulum in the proper direction and cause proper inclination of the stator 23, as one or the other contacts is made and broken.

In addition to or instead of the above described mechanism for maintaining the ball vertical, we prefer to provide means which automatically positions the stator at the correct inclination to maintain the ball vertical in accordance with the latitude of the apparatus and the position of the pedestal in azimuth. For this purpose we provide a cosine ring 101 (Fig. 11), the inclination of which is preferably settable in accordance with the latitude and speed as by means of the arbitrary scale 102. Said ring is preferably positioned in azimuth, both from the compass and from the gun, so that it will generate the required corrections in accordance with the position in azimuth of the pedestal which, of course, is the same as the position of the gun or sight. To this end we drive one element of a differential gear train 103 from a repeater motor 104 (Fig. 12) driven from a master gyroscopic compass (not shown) and we drive another arm of said train from the aforesaid gun position transmitter through repeater motor 105. The third arm turns the cosine ring 101 through bevel pinions 106. Positioned in a groove in said ring is a roller 107 on arm 108 pivoted at 109. The movements of said arm are transmitted through the rack teeth 109' to toothed wheel 110 which operates spring contacts 111 similar to contacts 100. There is also connected to said ring a roller 112 positioned at right angles to the roller 107 and actuating a similar arm 108' shown diagrammatically in Fig. 12 to turn a similar toothed wheel 110' to actuate spring contacts 111'. Said contacts 111—111' are in parallel respectively with the contacts 100 and 100' so that either mechanism will operate to displace the pendulums.

One advantage of the cam mechanism 101 is that it will transfer a given inclination of the stator about one axis to the other axis when the ship changes its course 90 degrees, for instance, so that no error is temporarily introduced as might be the case if the correction device was not brought into operation until the cup becomes inclined, due to the rotation of the earth. This mechanism, therefore, greatly lessens the operation of the tilt-detecting device and increases the accuracy of the apparatus.

Figures 7, 8, 9, 10:
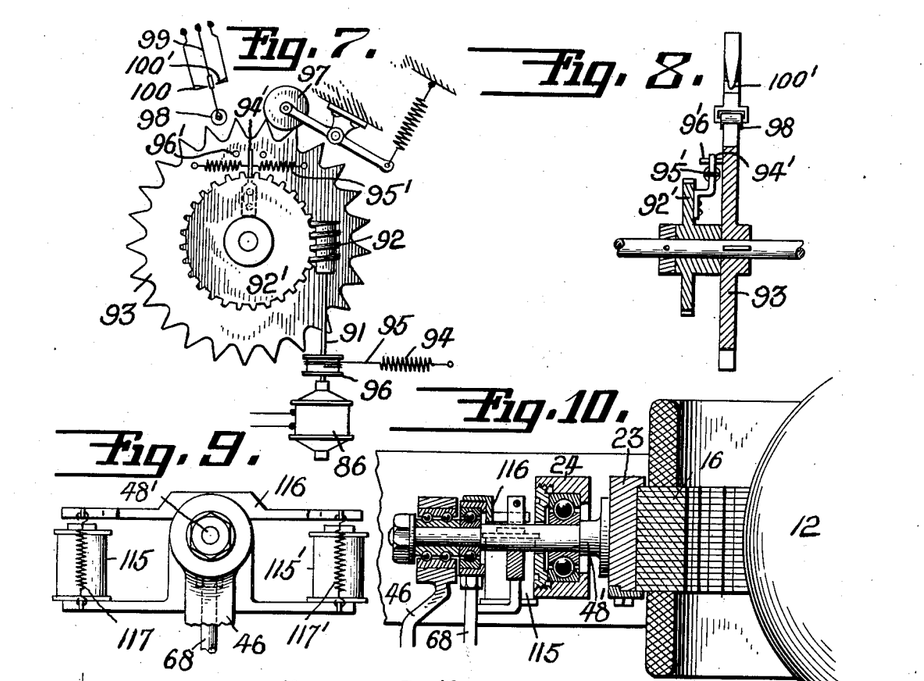
Fig. 7 shows in detail one part of the correcting device in elevation.
Fig. 8 shows the same device in a section.
Fig. 9 gives the details of the electro-magnetic corrector.
Fig. 10 is a sectional view of the connection of the electro-magnetic corrector to one axis of the stator.
Figure 11:
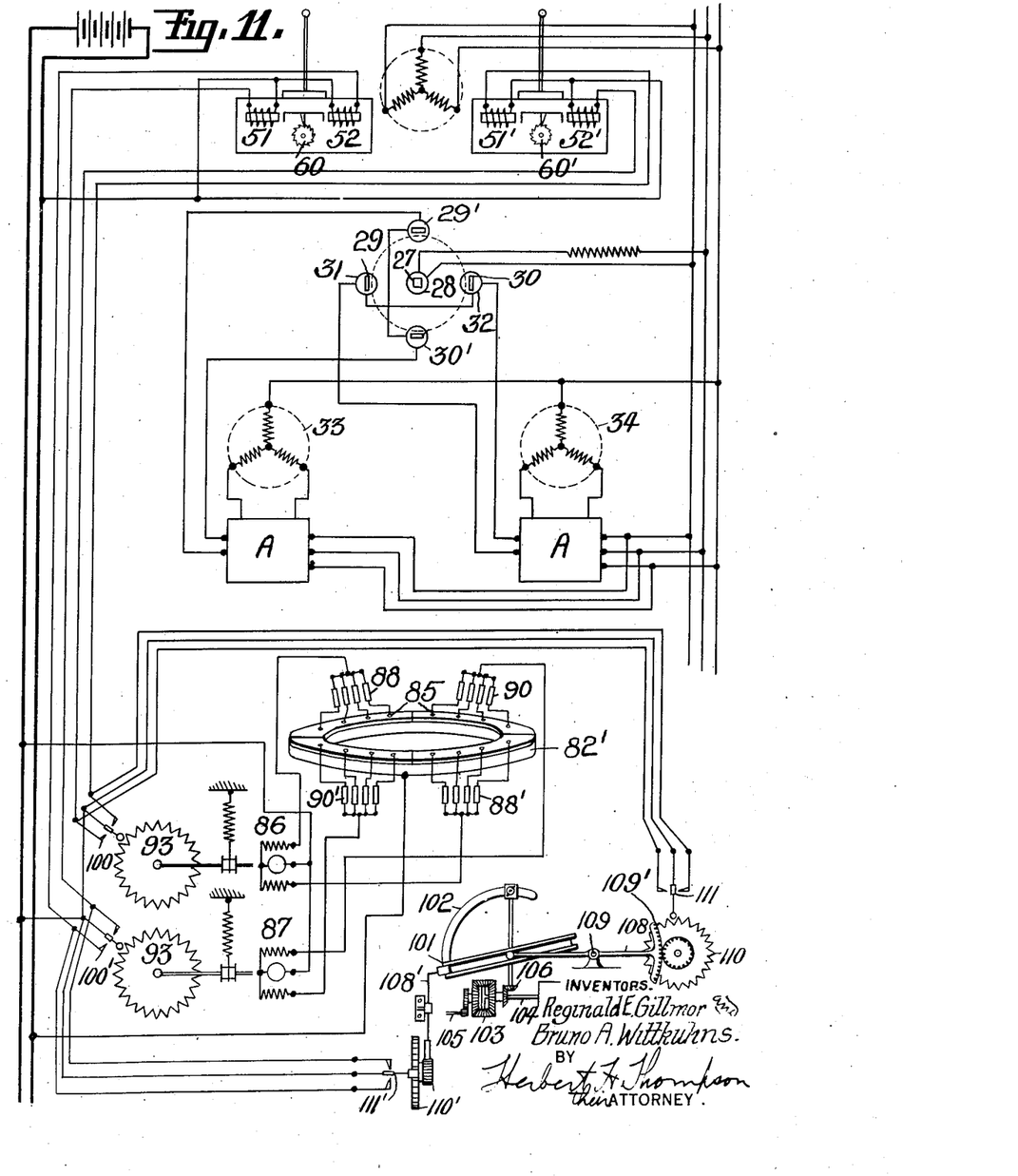
Fig. 11 is a complete wiring diagram of the artificial horizon with its correcting devices.
Figure 12:
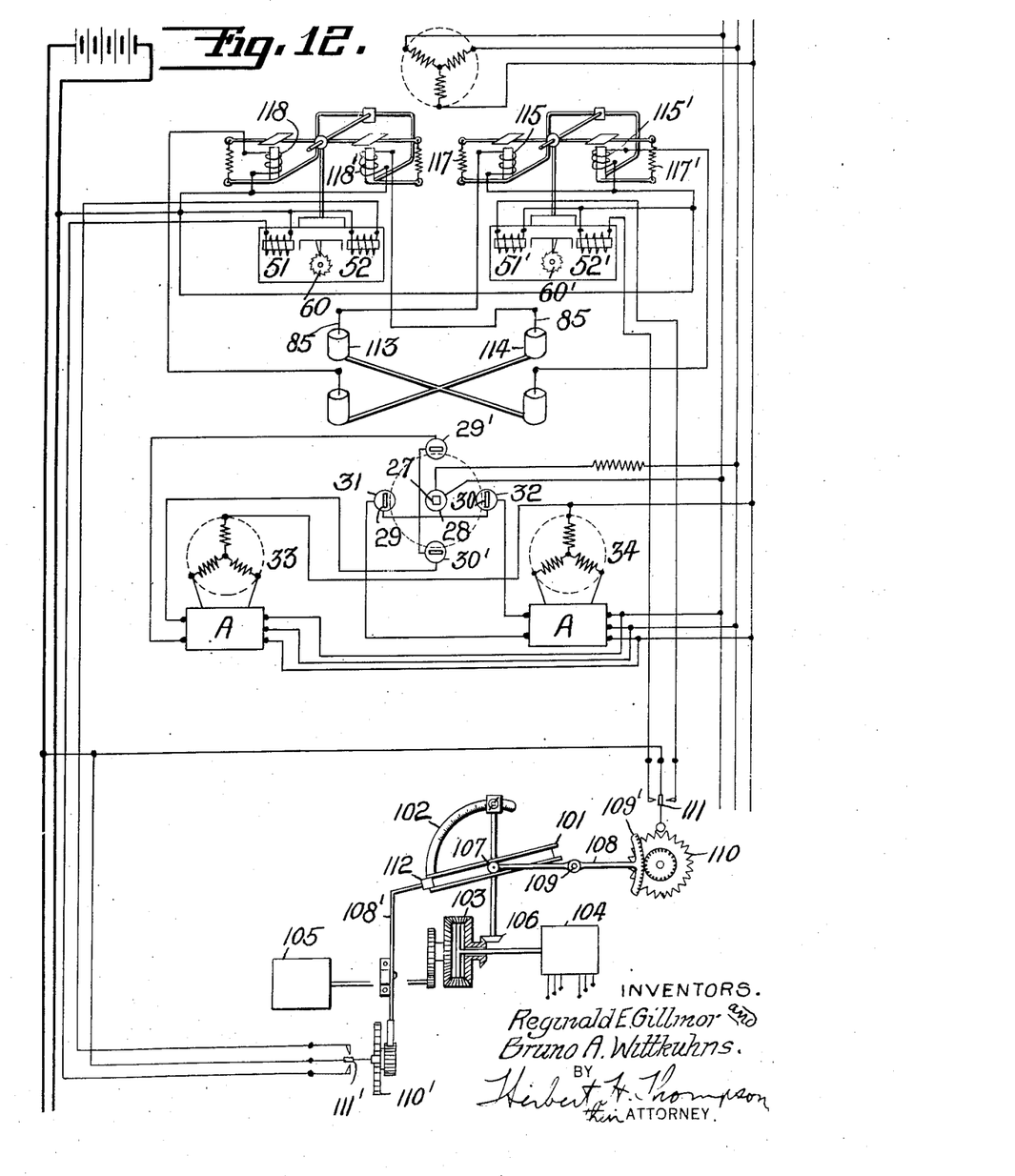
Fig. 12 is the complete wiring diagram of an artificial horizon with a modified form of corrector.

A slightly different form of tilt-detecting arrangement is shown in Fig. 12. In this form four inter-connecting mercury cups 113—114 are provided, each cup being provided with a contact 85 as in Fig. 2. Each pair of cups is in circuit with a pair of electro-magnets 115—115' acting on pivoted armature 116 (see Figs. 9 and 10). Said armature is normally maintained horizontal and out of contact with both magnets by springs 117—117' and is secured to shaft 48' of the stator. When, therefore, one of the magnets becomes excited it pulls down strongly on its armature and exerts a large torque on the stator to displace the same and quickly bring the ball to vertical position. It will be understood that the other set of cups 114 acts similarly on magnets 118, acting about the other axis of the stator. In Figs. 11 and 12 we have also shown diagrammatically the electrical connections from the controller 28 to the polyphase motors 33—34, the amplifier being shown diagrammatically at Amp. in each instance.

The operation of our device is as follows: After the device is set in operation the trunnion axes are maintained in line with the trunnion axis of the gun, as explained, and the pendulums may be carefully lined up by sighting through the sights 76, 76'. Assuming that the latitude adjustment has been properly set, the ball should remain with its axis vertical and the position of the spinning axis thereof is automatically transmitted to a distance by the fact that the cup 13 and its frame are maintained in line with the trunnion axis of the ball by the follow-up system described, and the position of the cup about both trunnion axes is transmitted by the transmitters 79, 80 to the sight, correction computer, trunnion tilt corrector, etc. In case the ship changes its heading, the stator is freely tilted in a different plane the proper amount through the action of the cosine ring 101, and the contacts controlled thereby shift the center of gravity of the pendulums 46—47 connected to the stator. In case of inclination of the ball due to any cause, such inclination is detected by the mercury contact device 82 and the center of gravity of the auxiliary pendulum is shifted through the contact devices 100—100'.

The principal purpose of the correction mechanism above described is, of course, to assure the true vertical position with respect to the ship being transmitted, and since this is the case, obviously the correction might be introduced between the position of the ball and the transmitters. That is, instead of bringing the ball to the true vertical, the ball might be allowed to assume its natural inclination and the known correction introduced at the transmitters. This would obviously secure the same result as outlined above and in a somewhat simpler manner. In such case, instead of employing the pawl and ratchet mechanisms shown in Figs. 3 and 4 to shift the center of gravity of the stator, we may employ similar mechanisms indicated generally in Fig. 16 to shift the positions of the two transmitters 79 and 80 to introduce the components of this correction, which is computed either by the eccentric grooved ring 101 as shown in Figs. 11 and 12 or by the correction mechanism shown diagrammatically in Fig. 17, and the components transmitted respectively to the ball and ratchet mechanisms 60 and 60' to shift the positions of the transmitters slightly with respect to the driving gears 38 and 44. As shown, each ratchet mechanism turns an irreversible worm 62' meshing with the worm sector 120 on the frame of the transmitter 79', the transmitter being mounted on an arm 121 pivoted for rotation about the sector of the shaft 48. The transmitter is normally anchored by the irreversible worm to the base 122, but is adjustable to apply the above correction by the turning of the worm 62' from the correction mechanism.

Figure 13:
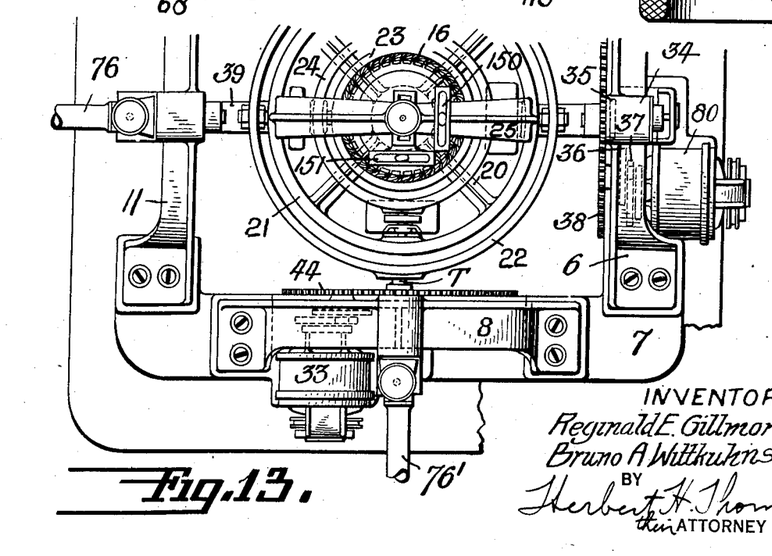
Fig. 13 is a plan view of the artificial horizon.
Figures 16, 17, 18:
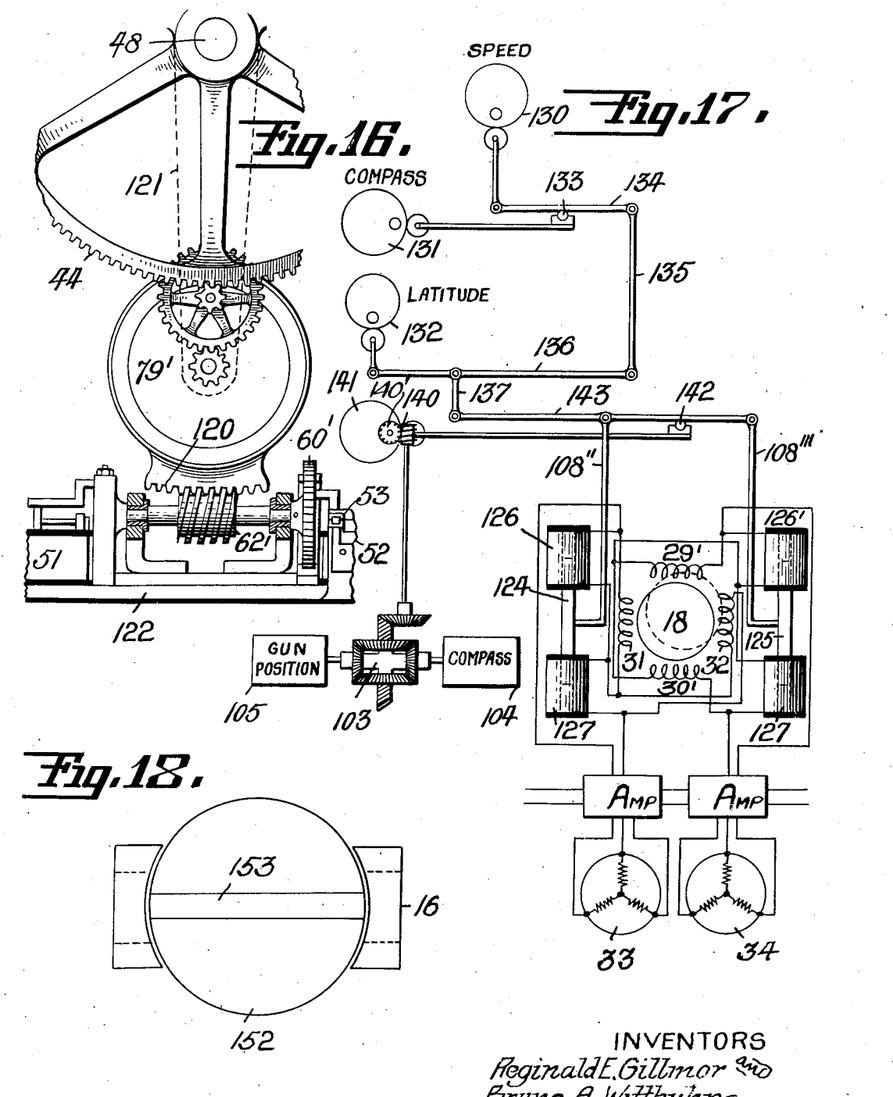
Fig. 16 is a detailed view showing a modified method of introducing corrections into the transmitted readings without disturbing the ball.
Fig. 17 is a diagrammatic view of still another modification in which the corrections are introduced between the ball and the follow-up mechanism.
Fig. 18 is a diagrammatic view showing a modified form of ball to illustrate how the period of the ball may be varied.

A still simpler method of effecting the correction is illustrated diagrammatically in Fig. 17. The correction computing device is also shown more in detail. In this form of the invention the follow-up device is maintained with its axis truly vertical although the ball gyro is allowed to assume its natural tilt. This is accomplished by applying the correction at the point where the follow-up device is controlled from the gyro, namely, the transformer coupling 18—27. It will readily be apparent that when the gyro is truly vertical that the follow-up framework would also be truly vertical only if the four coils 29'—30'—31—32 are exactly balanced or equal. If, for instance, an impedance is inserted which affects one coil without affecting or affecting oppositely the opposite coil, a new position of equilibrium would be set up in which the steel disc 18 would lie to one side of the center position as indicated by dotted line in Fig. 17, which illustrates the condition where an unbalanced condition exists between both pairs of opposed coils. As a means for inserting variable impedance, we have shown a solenoid placed in parallel with each of the aforesaid coils, and the impedance of each solenoid is varied by varying the position of the common magnetic cores 124 and 125. Thus, solenoids 126 and 127 which are in parallel respectively with coils 31 and 32 have the common core 124, which extends only part way into each solenoid. When the core is symmetrically placed the strength of coils 31 and 32 will remain equal. If, however, the coil is moved up, for instance, the impedance of coil 126 will increase while that of 127 will decrease, thus inversely varying the strength of 31 and 32;—similarly with solenoids 126' and 127' and the coils 29' and 30'. For moving the solenoids we have shown them connected respectively to rods 108'' and 108''', which may correspond to the rods 108 and 108' of Figs. 11 and 12. We have shown, however, in this figure the complete correction device developed in diagrammatic form. The amount of natural inclination of the ball depends on the speed and latitude of the ship and the plane in which the inclination takes place must be known in azimuth. For the purpose of checking the accuracy of the corrected result obtained by the device, we may provide two bubble-in-liquid levels mounted on top of the cruciform control inductances. One level 150 is permanently mounted in the plane of one pair of inductances and the other 151 at right angles to the first (Fig. 13). Coarse and fine levels might be used about each axis, if desired. We have learned from experiences that such levels will enable very accurate checks to be made even on a rolling ship as there is always an instant at the extremes of the rolling movements when all acceleration ceases.

In case we employ levels for checking, we may dispense with the pins, reference marks and telescopes referred to in connection with Fig. 1. In addition, in order to transmit the vertical position with respect to the two horizontal axes, it is necessary to know the position of the trunnions of the gun, or in other words, the position of the principal axes of the ball support. These factors are all taken into consideration in Fig. 17. The speed correction is represented as introduced by the settable cam 130, the compass position by the cam 131, which may be driven by a repeater compass, and the latitude correction by the dial 132. The speed and compass corrections are shown as combined diagrammatically by representing the compass cam as shifting the fulcrum 133 of the lever 134, one end of which is moved by the speed dial 130. Link 135 will, therefore, be moved from the combined speed and heading factors. The latitude correction is shown as applied to one end of the lever 136, the other end being coupled to 135 so that the combined correction is taken off by link 137. As above explained it is necessary to resolve this correction into two components parallel to the trunnion axes, and this is done as in Figs. 11 and 12 from gun position repeater motor 105 and compass repeater motor 104 which actuate a differential 103, and the resultant movement taken off and transmitted to worm 140, which turns the cam 141 through worm wheel 140' to position the fulcrum 142 so that shifting of the fulcrum results in the proper movements of the two links in accordance with the component angles about each trunnion axis. Since the ball in this form of the invention actually changes its settling point upon a change of course or speed, it is highly desirable to have a ballistic or pendulous factor such that when the ship changes speed or course, the ballistic effect of the acceleration pressures or centrifugal forces will shift the ball axis precisely from one virtual vertical to another dead beat without overshooting or undershooting. The means described before for obtaining any desired relation between efficiency of drive about the major axis and about the other axes permit us to so alter the ballistic (and consequently the period) of the pendulum as to obtain this result.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An artificial horizon comprising a ball-like rotor, means for spinning said rotor about a normally vertical spinning axis, a cup for supporting the rotor and furnishing a bearing for the rotor lubricated by an air film, and follow-up means responsive to the position of the vertical spinning axis of said ball for maintaining the axis of the cup aligned with said spinning axis.

2. An artificial horizon comprising a ball-like rotor, means for spinning said rotor about a normally vertical spinning axis, a cup for supporting the rotor and furnishing a bearing for the rotor lubricated by an air film, a support in which said cup is pivotally mounted, follow-up means responsive to the position of said ball's vertical spinning axis for maintaining the axis of the cup in said spinning axis, and means for transmitting to a distance the position of the vertical line established by the spinning axis of the ball by transmitting the position of said cup with respect to its support.

3. An artificial horizon comprising a ball-like rotor, means for spinning said rotor about a normally vertical spinning axis, a cup for supporting the rotor and furnishing a bearing for the rotor lubricated by an air film, follow-up means responsive to the position of said ball's vertical spinning axis for maintaining the axis of the cup in said spinning axis, means for detecting deviations of said cup from the horizontal, and means brought into action thereby for shifting said spinning means to correct the position of the rotor axis.

4. An artificial horizon for ships comprising a ball-like rotor, a cup for supporting the rotor and furnishing the bearing therefor, a universal support for said cup, means around the rotor for spinning the same, and a universal support for said spinning means independent of said cup support.

5. An artificial horizon for ships comprising a ball-like rotor, a cup for supporting the rotor and furnishing the bearing therefor, a universal support for said cup, a stator around the rotor for spinning the same, a universal support for the stator, and means for giving said stator independent of said cup support a predetermined inclination whereby a torque in a plane inclined to the horizontal is applied to the rotor to compensate for the vertical component of the earth's rotation.

6. An artificial horizon for ships comprising a ball-like rotor, a cup for supporting the rotor and furnishing the bearing therefor, a universal support for said cup, a stator around the rotor for spinning the same, a universal support for the stator, means for giving said stator independent of said cup support a predetermined inclination whereby a torque is applied to the rotor to compensate for the vertical component of the earth's rotation, and means for maintaining the axis of said inclination fixed with respect to the earth when the ship turns.

7. An artificial horizon for ships comprising a ball-like rotor, a cup for supporting the rotor and furnshing the bearing therefor, a universal support for said cup, a stator around the rotor for spinning the same, a universal gimbal support for the stator independent of the cup support, and means for varying the inclination of said stator about its gimbal axes for correcting the position of the rotor axis.

8. An artificial horizon for ships comprising a ball-like rotor, a cup for supporting the rotor and furnishing the bearing therefor, a universal support for said cup, a stator around the rotor for spinning the same, an independent universal support for the stator having two axes of support, and means for laterally shifting the center of gravity of said stator about either axis to vary the inclination thereof.

9. An artificial horizon for ships comprising a ball-like rotor, a cup for supporting the rotor and furnishing the bearing therefor, a universal support for said cup, a stator around the rotor for spinning the same, and means for altering the normal inclination of the stator to correct for errors due to the rotation of the earth.

10. An artificial horizon for ships comprising a ball-like rotor, a cup for supporting the rotor and furnishing the bearing therefor, a universal support for said cup, a stator around the rotor for spinning the same, means for altering the normal inclination of the stator to correct for errors due to the rotation of the earth, including means for setting said last-named means in accordance with the latitude and position of said cup support in azimuth, and means for automatically varying the plane of inclination with respect to the ship in accordance with changes in heading of the ship to maintain said plane fixed with respect to the earth.

11. An artificial horizon for ships comprising a ball-like rotor, a cup for supporting the rotor and furnishing the bearing therefor, a universal support for said cup, a stator around the rotor for spinning the same, means controlled by said support for transmitting to a distance the position thereof with reference to the ship, and means interposed in said transmission system for preventing the error otherwise due to the rotation of the earth from being transmitted.

12. An artificial horizon for ships comprising a ball-like rotor, having the plane of its maximum moment of inertia about its vertical axis, a cup under said rotor for supporting the same and furnishing the only bearing therefor, an electrical stator around the horizontal diameter of said rotor, and universal pendulous supporting means for said cup and stator.

13. An artificial horizon comprising a ball-like rotor, means for spinning said rotor on a normally vertical spinning axis, a cup for supporting the rotor and furnishing a bearing for the rotor lubricated by an air film, follow-up means responsive to the position of said vertical spinning axis for maintaining the axis of the cup in said spinning axis, means for computing the error due to the earth's rotation at the place where and in the position which the horizon is located, and means brought into action thereby for tilting said spinning means to correct the position of the rotor axis.

14. An artificial horizon comprising a ball-like rotor, means for spinning said rotor on a normally vertical spinning axis, a cup having a normally vertical axis for supporting the rotor and furnishing a bearing for the rotor lubricated by an air film, follow-up means responsive to the position of said vertical spinning axis for maintaining the axis of the cup in said spinning axis, means for calculating the error due to the earth's rotation for any given course, speed or latitude of the ship and means for applying a correction equal to said error to said follow-up means to maintain said cup vertical while permitting inclination of the spinning axis of said rotor.

15. In a gyroscopic instrument subject to computable errors due to course, speed, latitude and the like, the gyroscope proper, a follow-up and transmission therefor, the latter including a variable gap transformer having opposed windings, motive means and transmitting means actuated therefrom, and means altering the position of said follow-up system with respect to said gyroscope to correct for such errors comprising means for computing the error and means actuated therefrom for altering the relative strength of said opposed windings whereby the position of equilibrium in said transformer is altered.

16. An artificial horizon comprising a ball-like rotor, a support therefor, a pendulous means supported independently of said rotor support, and means on said pendulous means for applying a spinning torque to said rotor in a horizontal plane whereby a periodic or dead-beat settling of said rotor axis in the vertical is obtained.

17. A ball gyroscopic vertical indicator comprising a ball, means for spinning the same about a vertical axis, and an indicator of the vertical on the ball, the axis of maximum moment of inertia of the ball being coincident with the axis of said indicator.

18. An artificial horizon comprising a ball-like rotor, a pendulous means supported independently of said rotor, means on said pendulous means for spinning said rotor about a vertical axis, and means for shifting the center of gravity of said pendulous means with respect to its support for impressing a correction on the position of the spinning axis of said ball.

19. In a gyro vertical, the combination with a gyroscopic ball, a cup for supporting the same on a self-generated air film, and means for applying a spinning torque to the ball in a substantially horizontal plane.

20. An artificial horizon comprising a gyroscope adapted to be spun about a vertical spinning axis, follow-up means for following the position of said spinning axis in a plurality of planes, and a correction device settable in accordance with the speed and latitude of a ship and means for actuating the same in accordance with a function of the course of the ship for correcting the position of said follow-up to cause it to indicate the true vertical instead of the virtual vertical indicated by the said spinnig axis.

21. In a gyro vertical, a universally mounted gyroscope and a follow-up means for following relative inclination of the support and gyroscope comprising a plurality of cross-connected coils arranged in cruciform fashion on the follow-up means, a separate coil adjacent the center of the cruciform also on said means, a core of magnetic material on the gyroscope adapted to vary the relative induced currents in the secondaries of said coils, amplifying means governed by the output of said secondaries, and motive means controlled thereby for positioning the follow-up means about both axes.

22. In a gyro-vertical, the combination with the rotor, means for spinning the same about a normally vertical axis, an independent pendulous means for controlling the position of said spinning means, whereby the position of the spinning axis of the rotor is also controlled, and means responsive to relative inclination of the rotor axis and pendulous means for giving the spinning means a counter tilt.

23. In a gyro vertical, the combination with a gyroscopic ball, a pendulously supported A. C. stator for spinning said ball in a substantially horizontal plane with a vertical spinning axis, and a cup under the ball for supporting the same on a self-generated air film.

24. In an artificial horizon having a gyroscopic rotor, means for universally supporting the same with its spinning axis normally vertical, said rotor when spinning being free of any physical connection between itself and said support, follow-up means controlled by said rotor for stabilizing said supporting means, and means for preventing the rotation of the earth from causing inclination of said axis including means responsive to inclination of said supporting means for applying a corrective torque on the rotor.

25. An artificial horizon comprising a ball-like rotor, means for spinning said rotor on a normally vertical spinning axis, a cup for supporting the rotor and furnishing a bearing for the rotor lubricated by an air film, means for setting in a computed correction in accordance with the latitude, and means actuated by the said setting means for tilting said spinning means an amount sufficient to prevent tilt of the spinning axis due to latitude.

26. In a gyro vertical, the combination with a gyroscopic ball, a cup for supporting the same on a self-generated air film, means for applying a spinning torque to the ball in a substantially horizontal plane, and means for tilting the plane of said last named means slightly for correcting for latitude.

27. In a gyro vertical, the combination with a gyroscopic ball, a pendulously supported A. C. stator for spinning said ball in a substantially horizontal plane with a vertical spinning axis, a cup under the ball for supporting the same on a self-generated air film, and means for laterally shifting the center of gravity of said stator to vary the inclination thereof.

28. An artificial horizon for warships comprising a ball-like rotor, a cup for supporting the rotor and furnishing the bearing thereof, a universal support for said cup, means for rotatably mounting said support in azimuth, means for maintaining the gimbals thereof in line with the trunnion axis of the guns, a stator around the rotor for spinning the same, means for altering the normal inclination of the stator to correct for errors due to the rotation of the earth, including means for computing the amount and plane of inclination with respect to the ship in accordance with the heading of the ship and the bearing of the ship's guns, and means for controlling said inclination means from said computing means.

29. An artificial horizon for warships comprising a ball-like rotor, a cup for supporting the rotor and furnishing the bearing therefor, a universal trunnion support for said cup, means for maintaining a trunnion thereof parallel to the trunnion axis of a gun, a stator around the rotor for spinning the same, a universal support for the stator independent of said cup support, means for giving said stator a predetermined inclination whereby a torque is applied to the rotor to compensate for the vertical component of the earth's rotation, and means for maintaining the axis of said inclination fixed with respect to the earth when the ship turns and when said gun turns.

REGINALD E. GILLMOR.
BRUNO A. WITTKUHNS.